H. WILLARD.
Portable Fence.
No. 79,884.
Patented July 14, 1868.
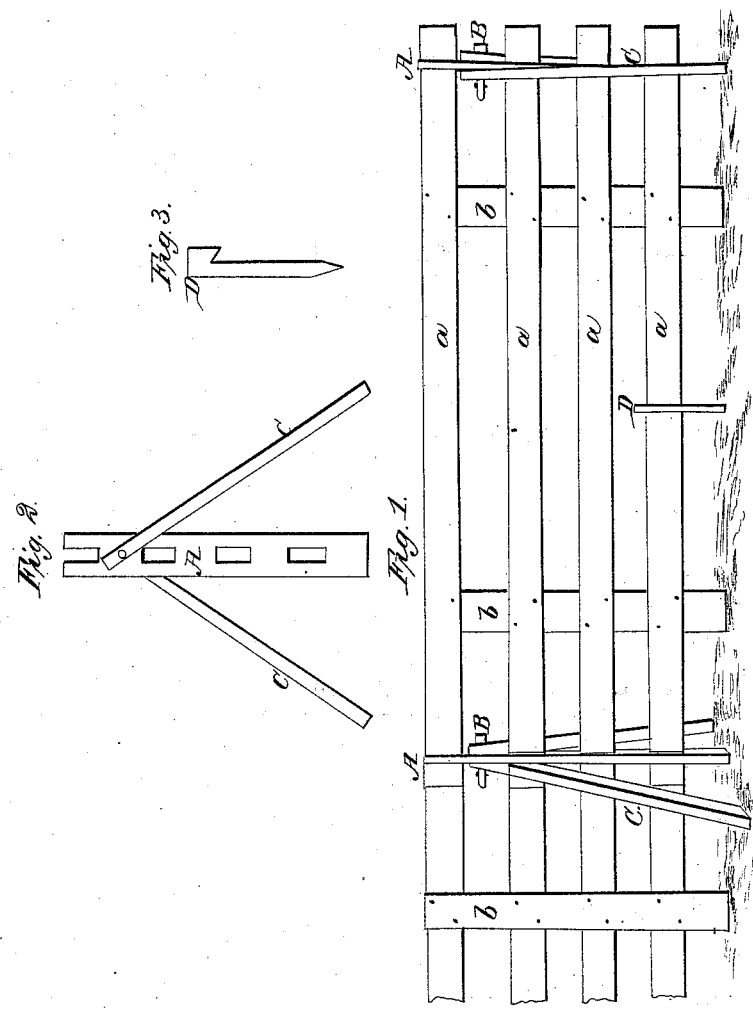

United States Patent Office.

HENRY WILLARD, OF RIPON, WISCONSIN.

Letters Patent No. 79,884, dated July 14, 1868.

IMPROVEMENT IN PORTABLE FENCE.

The Schedule referred to in these Letters Patent and making part of the same.

TO ALL WHOM IT MAY CONCERN:

Be it known that I, HENRY WILLARD, of the city of Ripon, Fond du Lac county, State of Wisconsin, have invented a new and improved Portable Fence; and I do hereby declare that the following is a full and exact description thereof, reference being had to the accompanying drawings, and to the letters of reference marked thereon.

The object of my invention is to provide a farm-fence that can be taken down, removed, and set up at pleasure, and being adapted to any grade, can easily be kept perpendicular by the adjustable braces, and the working of the boards in the mortised posts.

Figure 1 in the drawings represents a vertical section of the fence.

Figure 2, a transverse section.

Figure 3, the hook for fastening the bottom of fence to the ground.

In fig. 1, a a a a represent the boards of fence, the number being immaterial, fastened together by cross-boards b b. The ends of panels or sections of fence pass through mortised posts, as seen in A, fig. 2, supported transversely by the adjustable braces C C, which are connected to the fence by means of the pin B, passing through the braces C C and mortised post A. The hook D, fig. 3, being driven into the ground, holds the bottom firmly, and prevents a lateral movement by the action of the wind.

Having described my invention, what I claim, and wish to secure by Letters Patent, is—

The adjustable braces C C, the mortised posts A, the hook D, and the pin B, the whole arranged and combined with the fence in the manner substantially as and for the purposes shown and described.

HENRY WILLARD.

Witnesses:
F. M. HUBBARD,
GEO. L. FIELD.